(12) United States Patent
Liu

(10) Patent No.: US 12,124,026 B2
(45) Date of Patent: *Oct. 22, 2024

(54) LED SYNCHRONIZATION FOR VIRTUAL AND AUGMENTED REALITY DEVICES

(71) Applicant: MICROSOFT TECHNOLOGY LICENSING, LLC, Redmond, WA (US)

(72) Inventor: Ping Liu, Issaquah, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/153,026

(22) Filed: Jan. 11, 2023

(65) Prior Publication Data

US 2023/0161374 A1 May 25, 2023

Related U.S. Application Data

(63) Continuation of application No. 16/877,965, filed on May 19, 2020, now Pat. No. 11,567,528.

(51) Int. Cl.
| | |
|---|---|
| G02B 26/06 | (2006.01) |
| G02B 27/01 | (2006.01) |
| G06F 1/12 | (2006.01) |
| G06F 1/14 | (2006.01) |
| G06T 19/00 | (2011.01) |

(52) U.S. Cl.
CPC ......... G02B 26/06 (2013.01); G02B 27/0172 (2013.01); G06F 1/12 (2013.01); G06F 1/14 (2013.01); G06T 19/006 (2013.01)

(58) Field of Classification Search
CPC .. G06F 1/14; G06F 1/12; G02B 26/06; G02B 27/0172; G06T 19/006; H04W 4/008; H04W 72/005; H04W 76/023; H04H 2201/11; H04H 2201/20
See application file for complete search history.

(56) References Cited

U.S. PATENT DOCUMENTS

| | | | | |
|---|---|---|---|---|
| 2011/0122237 A1* | 5/2011 | Hong | ................... | H04N 13/341 348/56 |
| 2011/0134231 A1* | 6/2011 | Hulvey | ................ | H04N 13/341 348/E13.059 |

* cited by examiner

*Primary Examiner* — Stephone B Allen
*Assistant Examiner* — Tamara Y. Washington
(74) *Attorney, Agent, or Firm* — Han Gim; Newport IP, LLC

(57) ABSTRACT

A master clock signal for an image capture device and a light emission device is accessed. The master clock signal is divided to generate a high frequency clock signal. A frame timer is used to measure a frame time of the image capture device based on cycles of the high frequency clock signal. Based on an exposure timing signal from the image capture device, estimating an exposure start time for the image capture device; is estimated. Based on the estimated starting time, the light emission device begins emission of a positional tracking pattern at the estimated starting time and for a duration determined by the measured frame time of the image capture device.

20 Claims, 12 Drawing Sheets

LED SYNCHRONIZATION FOR VIRTUAL AND AUGMENTED REALITY DEVICES

CROSS-REFERENCE TO RELATED APPLICATION

This application is a continuation of U.S. patent application Ser. No. 16/877,965, filed May 19, 2020, the content of which application is hereby expressly incorporated herein by reference in its entirety.

BACKGROUND

Virtual reality ("VR") devices enable users to view and interact with virtual environments. For example, a VR device might enable a user to explore a virtual environment. Augmented reality ("AR") devices enable users to view and interact with virtual objects while simultaneously viewing the physical world around them. For example, an AR device might enable a user to view the placement of virtual furniture in a real-world room. Devices that enable both VR and AR experiences might be referred to as mixed reality ("MR") devices. VR devices, AR devices, and MR devices are also commonly referred to as a near-eye device ("NED") or head-mounted device (HMD). The HMD may interface with a handheld controller and/or other handheld peripheral objects, e.g., as parts of a gaming system. To make a gaming experience more immersive, the poses of an HMD and a handheld controller may be tracked as the devices are moved through space by a user to provide inputs to control a user interface of the HMD. Such pose tracking also may be used for other computing device interactions than gaming.

In order to track a user's positional movements, or the movements of a separate controller for the HMD, some HMD devices utilize optical sensors such as cameras that detect LED markers that are illuminated in the vicinity of the HMD. When using such LED markers, it may be necessary to synchronize timing between LED emission and camera exposure. In particular, in 6 degree of freedom (DoF) AR/VR controllers with LED constellation-based tracking systems, the timing synchronization between the LED emitting time and the camera exposure window is important for image quality, accuracy, and power consumption. Bluetooth classic or Bluetooth Low Energy (BLE) typically have 10 ms or longer packet latencies and uncertainties that are not practical for LED emitting time control. Additionally, the camera module and Bluetooth chip on the HMD may run from different clock sources which can result in clock drift. These issues can make LED and camera timing synchronization a challenging task.

Inaccurate synchronization can lead to poor image quality and accuracy, which can lead to issues with controller tracking and thus negatively impact the user experience. Additionally, inaccurate synchronization can lead to unnecessary use of computing resources and excessive power consumption.

It is with respect to these and potentially other considerations that the disclosure made herein is presented.

SUMMARY

When LED optical synchronization mechanisms are implemented, such as that used in some 6 DoF VR controllers, the LED emitting time may be set much longer than the camera exposure time to ensure proper image capture. Because there is no timing synchronization between the HMD and 6 DoF controller, the optical image synchronization accuracy may be limited. In order to reduce excessive LED emit times, it is important to activate the LEDs close to the actual time of camera exposure. In many systems, due to uncertainties in the camera exposure times, the LED emit time can be much longer than the camera exposure time in order to ensure that the camera can capture the LED constellation. This can result in increased power consumption.

Additionally, it is desirable to reduce the camera exposure time so that the capture image can be more clear, especially when the camera or controller is in motion. For an HMD, optic synchronization requires a line-of-sight view so the HMD should have a clear view of the controller. Furthermore, whenever the controller moves outside of the camera field of view (FOV), the controller must enter re-initialization mode. During resynchronization, the LEDs typically need to be set to fully ON and with increased or maximum brightness in order to enable image capture and enter re-synchronization, which also increases power consumption.

Communications between the controller and HMD is typically wireless, which in many cases use Bluetooth. On the HMD, when a high frequency clock is used, the number of clock cycles for each camera frame (typically 90 Hz) needs to be counted to track camera frame times. Additionally, the start time of the LED cycle needs to be synchronized with the HMD.

Technologies are disclosed herein for implementing a Bluetooth physical layer wireless synchronization mechanism that does not require changes to existing Bluetooth physical and other protocol layers. The LED timing adjustment may be implemented at the nanosecond level to set the LED ON start time and ON duration for accurate timing control. As a result, the described systems and devices may save power and generate sharper and reduced blur images for improving controller constellation tracking accuracy, even when the devices are in motion. Once initial synchronization is established, the synchronization may be maintained until the system is powered off, even when the controller moves in and out of the camera FOV since the described wireless synchronization mechanism does not require line of sight between the HMD camera and controller LED.

The described technologies can enable the reduction of erroneous inputs at AR and VR devices and reduce the utilization of computing resources such as processor cycles and battery power. Technical benefits other than those specifically described herein might also be realized through implementations of the disclosed technologies.

In order to provide the technical benefits described above, and potentially others, the present disclosure includes implementation of phase lock loop (PLL) based clock multipliers to boost the master clock. An LED frame timer may be implemented to measure camera frame times to the desired accuracy. A wireless digital phase lock loop may be implemented for camera frame and LED timing synchronization by adding averaged camera and Bluetooth clock drift error into the LED Frame Counter to ensure that the synchronization error is within a desired range.

A Bluetooth RF RX/TX switching control pin or other RF detection circuit may be used as a Bluetooth synchronization reference. In one embodiment, two frame timers may be used to store the previous frame time and current frame time to generate a frame time error. The averaged frame time errors may be added to the current frame timer. In an embodiment, a hardware frame counter may be used to count the frame time and generate an accurate frame trigger signal.

An LED offset estimator may be used for LED initial start time estimation. A hardware LED offset counter and a LED duration counter may be used to control the LED start time and duration. The frame time error can be calculated on the HMD as well. In this case, the HMD may send the frame time once and then send the frame error thereafter.

The HMD camera may use an exposed strobe pin or other frame synchronization signal for camera frame and LED synchronization control between the HMD and controller. A parallel or serial controller with an enable pin and a pulse width modulation (PWM) input pin may be used to control LED constellation on/off and brightness. The brightness may be controlled by the HMD in a closed loop fashion. The HMD may command the controller to increase or decrease the brightness when the HMD determines that the LED constellation is too dim or too bright due to changes in the distance between the HMD and controller. Many camera devices have a strobe signal which can be used to track the camera start time. To find the LED start time, in one embodiment a binary search process may be implemented. In an embodiment, the LED may be turned on at the beginning of the first cycle of transmit time, and the HMD may determine if the LED can be detected. If the LED is not detected, then it can be determined that the LED is not activated during the first half of the cycle, and during the next cycle, the second half of the cycle can be assumed. The process can continue with the time period divided in half, and the search can continue in this fashion until the start time can be determined to a desired accuracy.

In some embodiments, if the same clock source is used for the HMD and controller, then the clock source need not be divided as there is no clock drift, while the other techniques can be employed to improve power consumption. In such embodiments, the PLL, hardware counters, and camera strobe signal, as well as the camera and Bluetooth clock drifting error estimation and correction functionality may be optional. The described techniques can be implemented in any situation in which the precise timing between master and slave devices is desired, such as in a time division duplex (TDD) wireless communication system that uses a RF RX/TX switching signal exposed on the HMD and 6DoF controller. While the examples described herein are in the context of a Bluetooth master signal, the described principles may be applied to other industrial or proprietary radio technology-based controllers other than Bluetooth.

It should be appreciated that the subject matter described briefly above and in further detail below can be implemented as a computer-implemented method, a computer-controlled apparatus or device, a computing system, or an article of manufacture, such as a computer storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those specifically described herein, including multiprocessor systems, microprocessor-based or programmable consumer electronics, minicomputers, mainframe computers, hand-held computers, smartphones, personal digital assistants, smart watches, e-readers, tablet computing devices, special-purposed hardware devices, network appliances, and the like.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
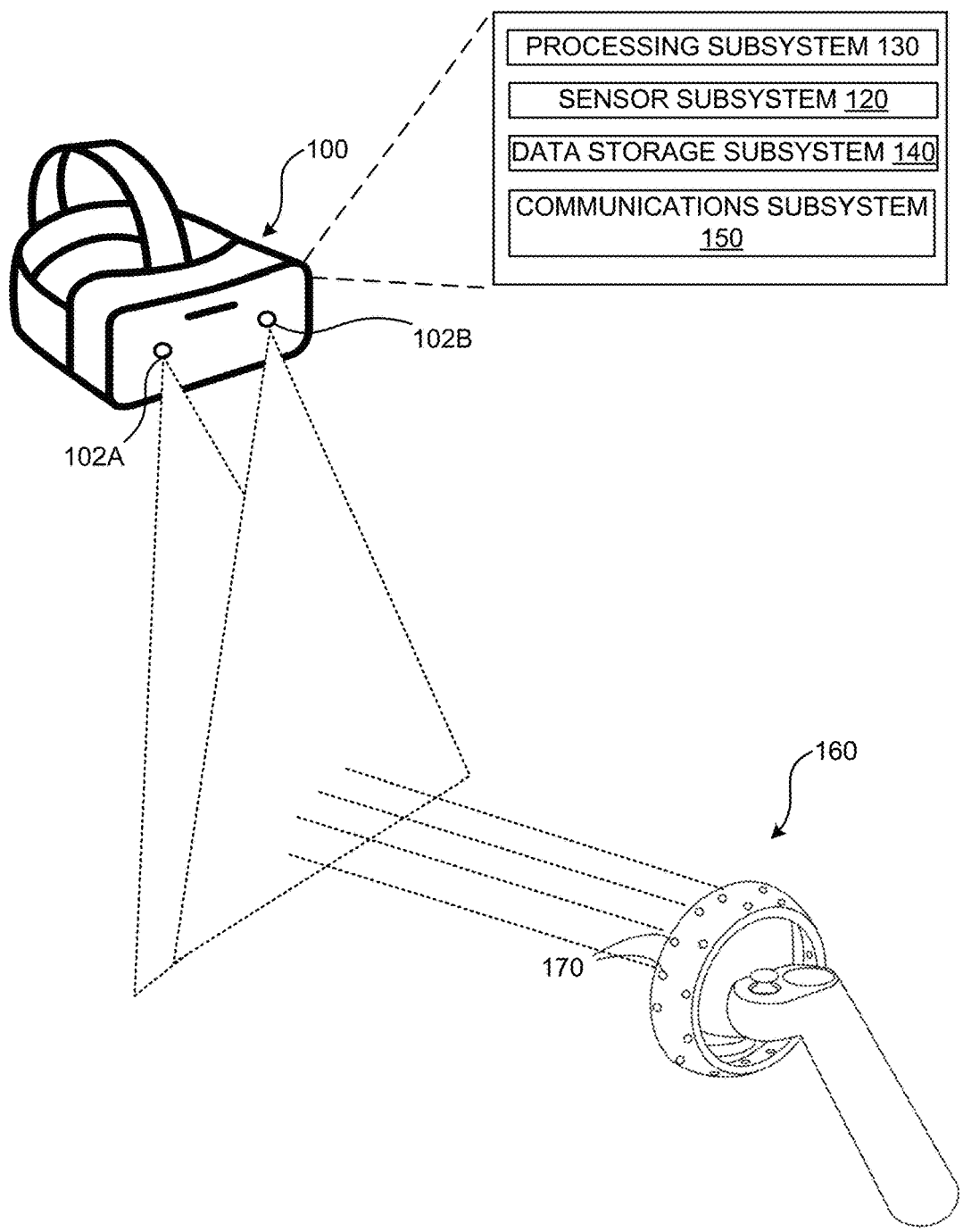
FIG. 1 is a computing device diagram showing aspects of a VR device and controller that can be utilized to implement the various configurations disclosed herein.

The disclosed examples may utilize cameras, such as a stereo camera arrangement, on an HMD for tracking a handheld object, such as a game controller. In 6DoF controllers with an LED (visible or IR) constellation-based tracking mechanism, the timing synchronization between LED emission time and exposure window of the HMD camera is important for image quality, accuracy, and power consumption. Bluetooth classic or BLE typically have 10 ms or longer packet latencies, which is not practical for LED emission time control. Additionally, the camera and Bluetooth devices on the HMD may run from different clock sources which can result in clock drift. For these reasons, LED and camera timing synchronization can be a challenging task.

The LED emission time control on some controllers may be based on an optical synchronization algorithm where the LED emit time is longer than the camera exposure time in order to ensure proper image capture. Because there is no synchronization between the HMD and controller, the optical image synchronization accuracy may be limited. Whenever the controller moves outside of the camera field of view (FOV), the controller must enter the re-initialization mode, which requires that all LEDs turn on with maximum brightness for re-synchronization. This can result in high power consumption.

The following Detailed Description describes technologies for enabling Bluetooth physical layer wireless synchronization without modifying existing Bluetooth physical and other protocol layers. The described techniques enable the LED ON time to be shorter than the camera exposure time. In this way, LED power consumption can be reduced and blurring of the LED constellation image can be minimized in situations where the controller is in motion. In some embodiments, only the RF TX/RX switching signal for external RF PA control may be used for timing synchronization. This signal is available in many Bluetooth chipsets. The described embodiments may be implemented independently of any particular chipset. Accordingly, the master and slave device chips need not be from the same manufacturer. Additionally, the described principles may be applied to other industrial or proprietary radio technology-based controllers other than Bluetooth.

The Bluetooth master device typically sends out a 3.2 KHz master wireless clock that is the time base for master and slave device physical layer time synchronization and packet transfer. This resolution is typically too low for 6DoF LED timing synchronization. However, the 3.2 KHz master wireless clock maintains the master and slave device in sync without clock drift. The present disclosure provides a way to implement a PLL-based clock multiplier to boost the clock from 3.2 KHz to 24 MHz or higher in order to provide accurate LED timing control at nanosecond levels.

When the camera clock and Bluetooth clock use difference clock sources, clock drift may result. In an embodiment, a digital PLL circuit and camera strobe signal may be implemented to ensure that the HMD camera and 6DOF controller LED remain in sync to the camera frame. Once the initial synchronization is established, the synchronization may be maintained even if the controller moves outside the camera FOV, as long as the Bluetooth wireless link is present.

Implementations of the disclosed subject matter may reduce the utilization of computing resources such as processor cycles and battery power by more efficiently synchronizing the controller and LEDs, reducing the possibility that the exposure needs to be repeated and thus reducing the power used by the HMD. Technical benefits other than those specifically described herein might also be realized through implementations of the disclosed technologies.

Turning now to the figures (which might be referred to herein as a "FIG." or "FIGS."), additional details will be provided regarding the technologies disclosed herein with reference to the accompanying drawings that form a part hereof. The FIGS. show, by way of illustration, specific configurations or examples. Like numerals represent like or similar elements throughout the FIGS.

In the FIGS., the left-most digit(s) of a reference number identifies the figure in which the reference number first appears. References made to individual items of a plurality of items can use a reference number with another number included within a parenthetical (and/or a letter without a parenthetical) to refer to each individual item. Generic references to the items might use the specific reference number without the sequence of letters. The drawings are not drawn to scale.

FIG. 1 is a computing device diagram showing aspects of the configuration and operation of a VR device 100 that can be utilized to implement the various technologies disclosed herein. The VR device 100, alone or in combination with one or more other devices (e.g. a local computer or one or more remotely-located server computers), might form a system that performs or otherwise implements the various processes and techniques described herein.

In the configuration shown in FIG. 1, the VR device 100 takes the form of a wearable, head-mounted display device that is worn by a user. It will be understood, however, that the VR device 100 might take a variety of different forms other than the specific configuration depicted in FIG. 1.

As discussed in greater detail below, the technologies disclosed herein can also be utilized with AR devices, such as the AR device 500 shown in FIG. 5 and described below. Although the configurations disclosed herein are discussed primarily in the context of AR and VR devices, it is to be appreciated that the technologies disclosed herein can also be utilized with MR devices and other types of devices that include at least one camera such as, but not limited to, smartphones, video game systems, tablet computing devices, and smartwatches.

The VR device 100 includes one or more display panels (not shown in FIG. 1) that display computer generated ("CG") graphics. For example, the VR device 100 might include a right-eye display panel for right-eye viewing and a left-eye display panel for left-eye viewing. A right-eye display panel is typically located near a right eye of the user to fully or partially cover a field of view of the right eye, and a left-eye display panel is located near a left eye of the user to fully or partially cover a field of view of the left eye.

In another example, a unitary display panel might extend over both the right and left eyes of a user, and provide both right-eye and left-eye viewing via right-eye and left-eye viewing regions of the unitary display panel. In each of these implementations, the ability of the VR device 100 to separately display different right-eye and left-eye graphical content via right-eye and left-eye displays might be used to provide a user of the VR device 100 with a stereoscopic viewing experience.

The VR device 100 might include a variety of on-board sensors forming a sensor subsystem 120. For example, and without limitation, the sensor subsystem 120 might include one or more outward facing optical cameras 102 (e.g., cameras located on an external surface of the VR device 100 and forward facing in a viewing direction of the user), such as the optical cameras 102A and 102B shown in FIG. 1. At least two or more cameras may be implemented for left and right FOV. The VR device 100 can also include one or more inward facing optical cameras (not shown in FIG. 1) (e.g., rearward facing toward the user and/or toward one or both eyes of the user).

The sensor subsystem 120 can also include a variety of other sensors (not shown in FIG. 1) including, but not limited to, accelerometers, gyroscopes, magnetometers, environment understanding cameras, depth cameras, inward or outward facing video cameras, microphones, ambient light sensors, and potentially other types of sensors. Data obtained by the sensors, including the cameras 102, of the sensor subsystem 120 can be utilized to detect the location, orientation (which might be referred to as a "pose"), and movement of the VR device 100. The location, orientation, and movement of the VR device 100 can be utilized to compute the view of the VR environment presented to the user by the VR device 100.

The one or more outward facing optical cameras 102 of the VR device 100 can be configured to observe the real-world environment and output digital images illustrating the real-world environment observed by the one or more outward facing optical cameras 102. The optical cameras 102 are black and white ("B&W") cameras in one particular configuration. It is to be appreciated, however, that other types of cameras 102 can be utilized in other configurations such as, but not limited to, red-green-blue ("RGB") cameras and infrared cameras.

The VR device 100 might also include a processing subsystem 130 that includes one or more processor devices that perform some or all of the processes or operations described herein, as defined by instructions executed by the processing subsystem 130. Such processes or operations might include generating and providing image signals to the display panels, receiving sensory signals from sensors in the sensor subsystem 120 such as the cameras 102, enacting control strategies and procedures responsive to those sensory signals. Other computing systems, such as local or remote computing systems might also perform some or all of the computational tasks disclosed herein.

The VR device 100 might also include an on-board data storage subsystem 140 that includes one or more memory devices storing computer-executable instructions (e.g., software and/or firmware) executable by the processing subsystem 130, and might additionally hold other suitable types of data. The VR device 100 might also include a communications subsystem 150 supporting wired and/or wireless communications with remote devices (i.e., off-board devices) over a communications network (not shown in FIG. 1). As an example, the communication subsystem 150 might be configured to wirelessly send or receive a video stream, audio stream, coordinate information, virtual object descriptions, and/or other information from remote devices to render virtual objects and textures on the integrated displays of the VR device 100. Examples of VR devices include, but are not limited to, the HTC VIVE VR device and the OCULUS RIFT VR device.

The controller 160 may be a controller, for example, for a video game system. The controller 160 may, in some examples, include an onboard processor, storage system, and communication system. In other examples, the controller 160 may include lights to assist in optical tracking of the controller 160. The controller 160 may also include one or more input controls, such as a button, trigger, joystick, directional pad, touch screen, etc. The controller 160 may comprise an inertial measurement unit (IMU) (which may include an accelerometer, gyroscope, magnetometer, and/or other suitable sensors) that provides output related to changes in position and orientation of the controller 160. In some examples, the VR device 100 may also include an IMU to help track changes in the HMD pose in the environment.

The controller 160 may include a plurality of light sources distributed over a surface of the controller 160. FIG. 1 shows the controller 160 having a plurality of light sources 170 distributed along both an exterior and interior of a ring-like structure of the controller 160. The light sources may be configured to form patterns of light ("constellations") in image data acquired by the camera or cameras of the HMD, such that a pose of the controller 160 may be determined from an image capturing the controller. The light sources may take any suitable form, such as light-emitting diodes (LEDs) that emit visible light for detection via a visible light camera or cameras on the HMD. Infrared light sources also may be used. In some examples, the camera(s) on the HMD may be configured to filter wavelengths of light other than those emitted by the LEDs to reduce noise levels in the image data. The controller 160 may have any suitable number and arrangement of light sources.

In some embodiments, the VR device 100 and controller 160 may be configured to communicate with one another directly, such as via a wireless network connecting utilizing a Bluetooth communication protocol or other suitable wireless communication protocol. In other embodiments, an optional host computing device (not shown) may communicate with the VR device 100 and the controller 160 to receive data from VR device 100 and controller 160 (including image data acquired by the VR device 100 and IMU data from the controller 160), to process such data, and to send control signals to these devices. It will be understood that while disclosed herein in the context of handheld controllers, any suitable handheld or movable object may be tracked, including objects without any internal computing system or IMU, where such objects include a plurality of light sources detectable as a constellation in image data. Likewise, the specific communication channels shown in the FIGS. are presented for the purpose of example, and any other suitable communications channels, wired and/or wireless, may be used for HMD-to-host communication, host-to-controller communication, and/or HMD-to-controller communication.

A relative-to-HMD pose (position and orientation) of the controller 160 may be estimated by tracking the positions of light from the light sources on the controller 160 using the one or more cameras on the VR device 100. Data from the IMU on the controller 160 can further inform tracking, such as when the light sources might be occluded from view. However, the image data provides a pose of the controller 160 relative to the VR device 100, while the IMU senses the forces proportional to the change in position and orientation in its body frame relative to the inertial frame. Thus, to combine the optical pose from image data with the IMU data to provide the actual pose of the controller 160 relative to the world, processing may be used to "fuse" the IMU data with the optical data by mapping the optical data to world coordinates.

FIG. 2 through FIG. 5 shows aspects of a system diagram of an AR/VR HMD (Head Mount Device) and 6 DoF controller synchronization with Bluetooth master clock.

Figure 2:
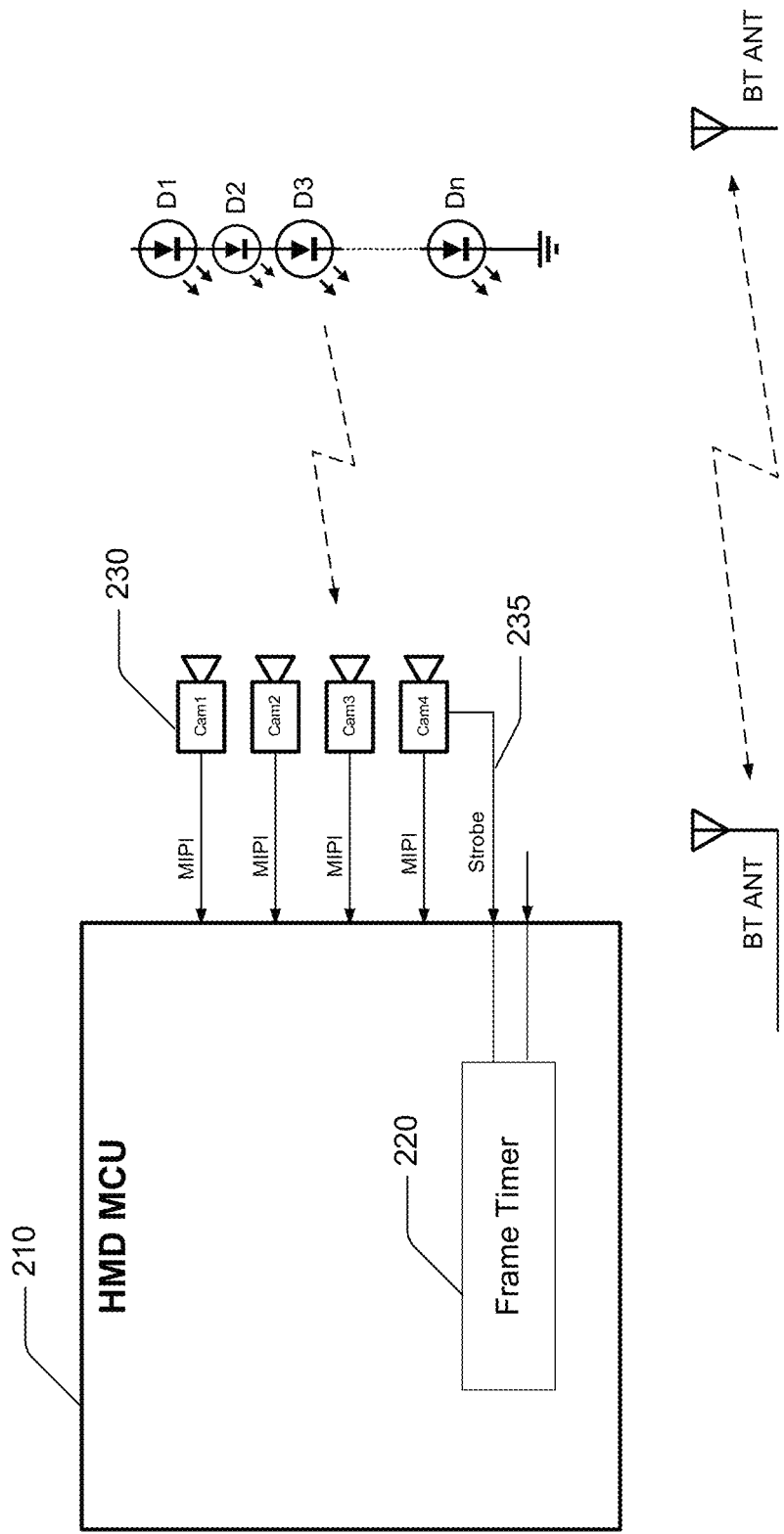
FIG. 2 is a diagram showing aspects of the configuration and operation of a device that can be utilized to implement the various configurations disclosed herein.

Referring to FIG. 2, illustrated is an HMD MCU 210, which may be a multi-media micro-controller with 2 to 4 head tracking cameras for head tracking and 6 DoF controller constellation tracking. Also illustrated is a frame timer 220 which may be part of a digital PLL configured to synchronize a camera frame with a 24 MHz synchronized clock that is phase locked to the 3.2 KHz Bluetooth master clock. The frame timer 220 measures the 90 Hz camera frame time with a 24 MHz sampling rate. The measured time is sent to the 6DoF slave controller device for LED timing synchronization and drift correction.

FIG. 2 illustrates head tracking cameras 230 with a flash strobe signal 235. In some implementations, there may be 2-4 or more cameras for HMD head and controller tracking. The cameras may be synchronized from the same clock source. One of the cameras may expose the flash strobe signal 235 as the camera time synchronization base at 60/90

MHz or higher. The start time and duration of the strobe signal may be programmable.

Figure 3:
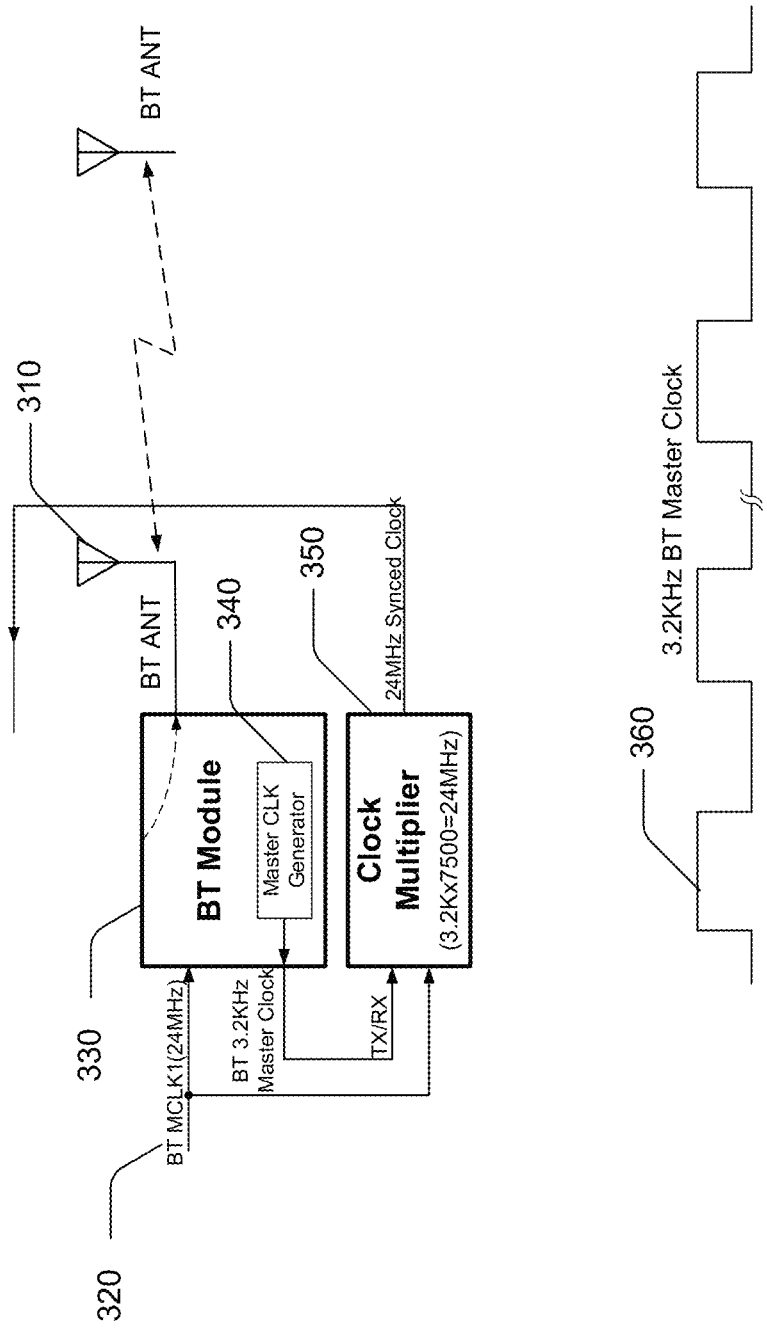
FIG. 3 is a diagram showing aspects of the configuration and operation of a device that can be utilized to implement the various configurations disclosed herein.

Referring to FIG. 3, illustrated is a Bluetooth master antenna 310. Also illustrated is Bluetooth master main clock 320, shown as BT MCLK1 (24 MHz). The Bluetooth master main clock 320 is the clock reference for the master Bluetooth chip. Also illustrated in FIG. 3 is the Bluetooth master module 330, which is the Bluetooth master controller on the HMD with the TX/RX switching signal exposed on the chip.

FIG. 3 further illustrates the master clock generator 340, which generates the 3.2 KHz master clock 360 for the Bluetooth master-slave physical layer timing reference. Also illustrated is the clock multiplier 350 which, in one embodiment, multiplies the master clock by 7500 to generate a 24 MHz synced clock for the frame timer input clock. In one implementation, the Cirrus Logic CS2000-OTP may be used. It should be understood that the master clock may be multiple by other values depending on the specific implementation.

Figure 4:
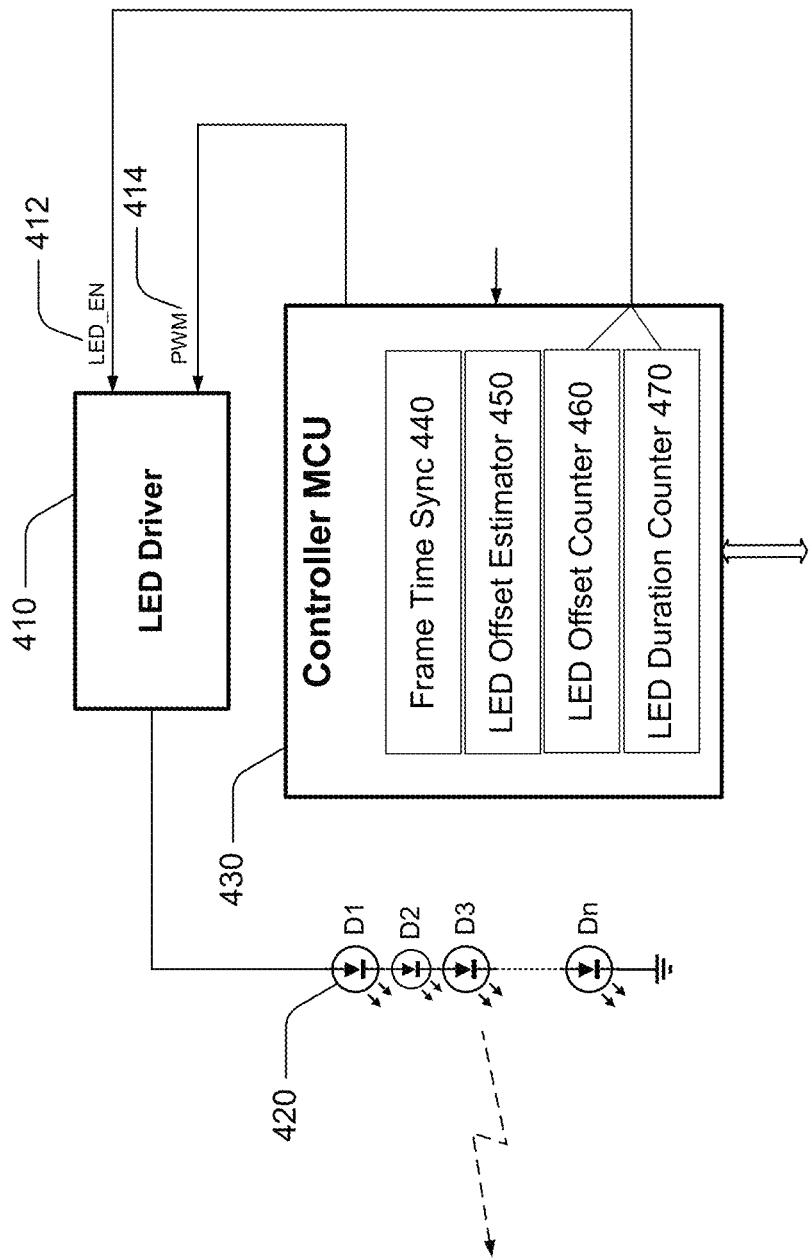
FIG. 4 is a diagram showing aspects of the configuration and operation of a device that can be utilized to implement the various configurations disclosed herein.

Referring to FIG. 4, illustrated is the LED driver 410 which drives one or more LED strings 420 with an enable pin 412 and PWM input 414 for LED ON/OFF and brightness control, respectively. Also illustrated is controller MCU 430 which may be a micro-controller for 6DoF controller LED timing and Bluetooth communication. LED string 420 comprises one or more serial or parallel LED strings configured to generate the constellation for 6DoF controller tracking.

FIG. 4 further illustrates frame time synchronizer 440 which generates the camera frame time from the frame time packet received from the master controller 430. The frame time synchronizer 440 compares the current and newer frame timer to estimate clock drift that is averaged to the frame timer before the next frame time pack is received during a fixed period. In this way, the frame time synchronizer 440 compensates for camera clock drift frame by frame without relying on the Bluetooth packet latency which could be as high as hundreds of milliseconds.

FIG. 4 further illustrates LED offset estimator 450 which may be configured to estimate the LED ON timing offset with reference to the frame start point for initial synchronization. Also illustrated is the LED offset counter 460 which stores the LED ON timing offset. The LED offset counter 460 may be adjusted to an accuracy of 1/24 MHz=41.6 ns, in some embodiments. FIG. 4 further illustrates the LED duration counter 470 which may be used to control LED ON time and may be adjustable. A shorter LED duration may enable a sharp and stable image when the controller is in motion.

Figure 5:
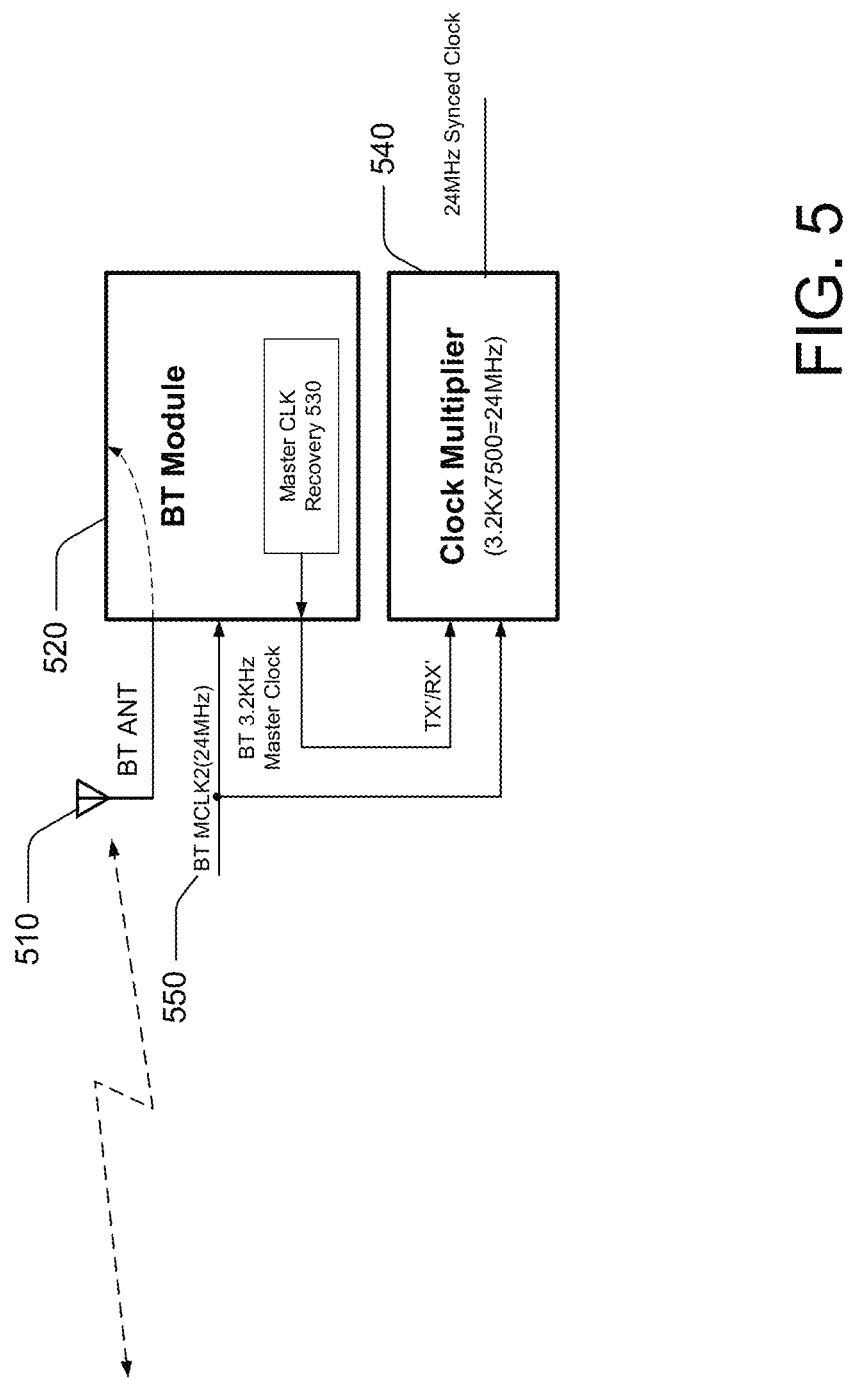
FIG. 5 is a diagram showing aspects of the configuration and operation of a device that can be utilized to implement the various configurations disclosed herein.

Referring to FIG. 5, illustrates the device Bluetooth antenna 510. Also illustrated is the Bluetooth slave module 520 which may be a Bluetooth slave device controller on the 6DoF controller with TX/RX switching signal exposed for master and slave synchronization. FIG. 5 further illustrates the master clock recovery function 530 that recovers the 3.2 KHz master clock as one of the clock multiplier inputs, which is inherent in the Bluetooth physical layer as a timing reference and RX/TX switching control. At a 1.5 m distance, the master clock and recovered master clock may have a 5 ns difference due to the TDD timing adjustment in the physical layer. The difference can be ignored for a 41.6 ns timing resolution without noticeable differences in LED timing control.

FIG. 5 further illustrates the clock multiplier 540 which may be the same as clock multiplier 350 in FIG. 3 and used for master clock multiplication to generate the 24 MHz synced clock as a frame time reference on the slave device.

Also illustrated is Bluetooth MCK2 (24 MHz) 550 which is the Bluetooth slave main clock that is the clock reference for the slave Bluetooth chip. The Bluetooth slave main clock has a clock that drifts compared to the master main clock because the master and slave use different clock sources. However, the output of the slave clock multiplier 540 is phase locked to the 3.2 KHz master clock to overcome the clock drift.

Figure 6:
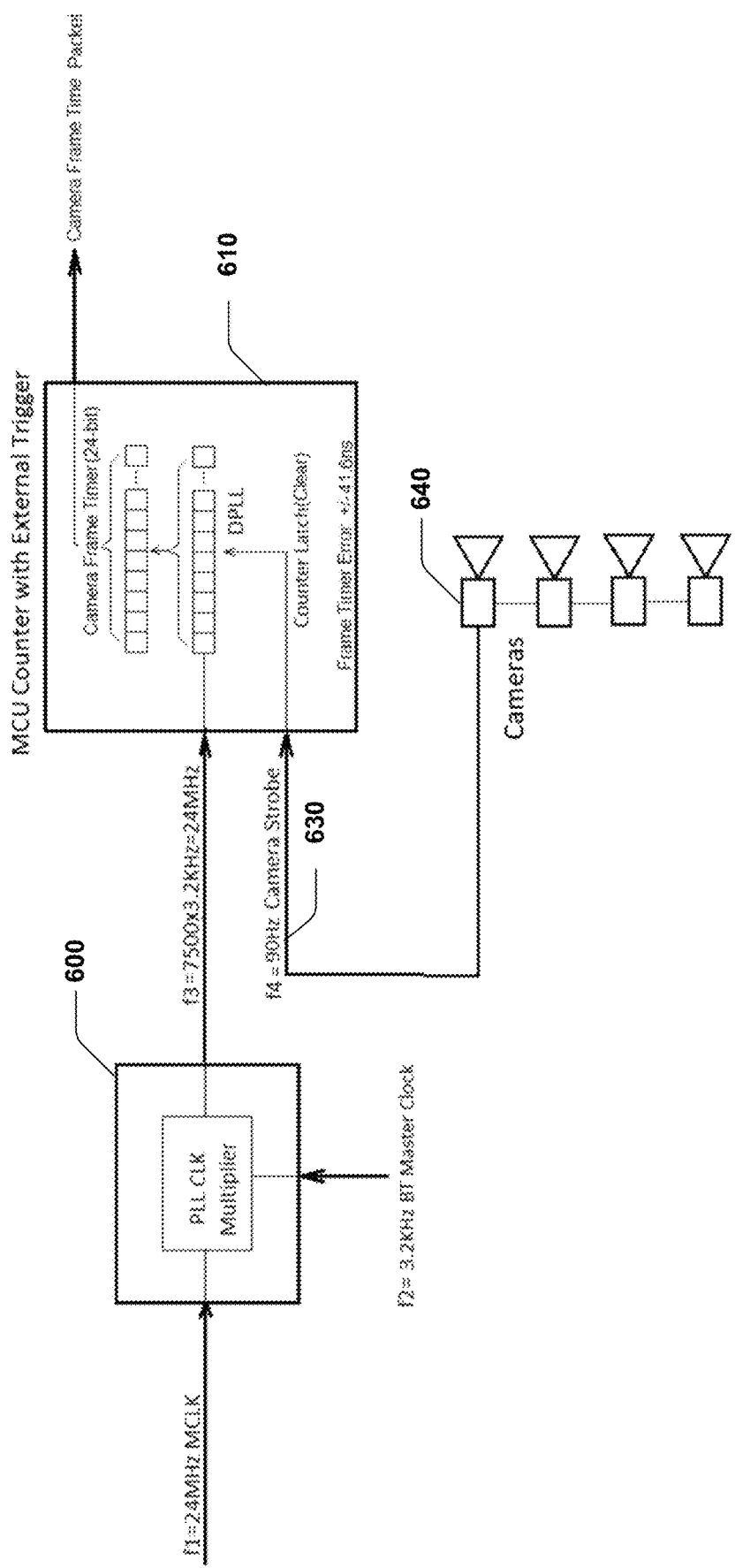
FIG. 6 is a diagram showing aspects of the configuration and operation of a device that can be utilized to implement the various configurations disclosed herein.

Referring to FIG. 6, illustrated are various components on the HMD according to some embodiments. Illustrated is a PLL based Clock Multiplier 600 that takes a 24 MHz (BT MCLK) f1 clock as one of two inputs. The other input is the 3.2 KHz BT master clock. The output f3 is 24 MHz but locked to the master clock phase which allows for 24 MHz f3 clock recovery on the controller side without clock drift. Also illustrated is HMD MCU timer/counter 610 with an external event trigger that is available on many micro-controllers. The 24-bit timer/counter input is phase locked to the 24 MHz f3 clock. The trigger event is the camera strobe signal 630, which is an accurate camera exposure timing reference. The camera strobe signal 630 may be used to measure the camera frame period and send the camera frame period to the controller MCU for the LED timing reference.

For the 10 ppm clock source, the maximum measurement error per frame is 0.22 us. The error can accumulate frame by frame due to the camera and BT clock having different sources. This error can be eliminated by using the same 24 MHz clock source for the camera and BT on the HMD side or by sending the camera frame time measured by the 24 MHz clock f3 clock to the controller for periodic correction, such as every 100 frames.

The error $\Delta FT$ may be averaged to $\Delta FTi=[\Delta FT/n]$, i=1~100, n=100 for example. $\Delta FTi$ is an integer and the remainder of $\Delta FT/n$ may be added to the current frame counter, one per frame. In this way, the time difference between adjacent frames is no more than 41.6 ns.

FIG. 6 further illustrates the HMD head and controller tracking cameras 640 with the strobe signal exposed. The cameras 640 may be synchronized from the same clock source. Camera sensors typically have a strobe signal for flash light control. In an embodiment, at least one of the cameras 640 has its strobe signal exposed. Although the frame synchronization signal may be used for the same purpose, the strobe signal is programmable and more flexible.

Figure 7:
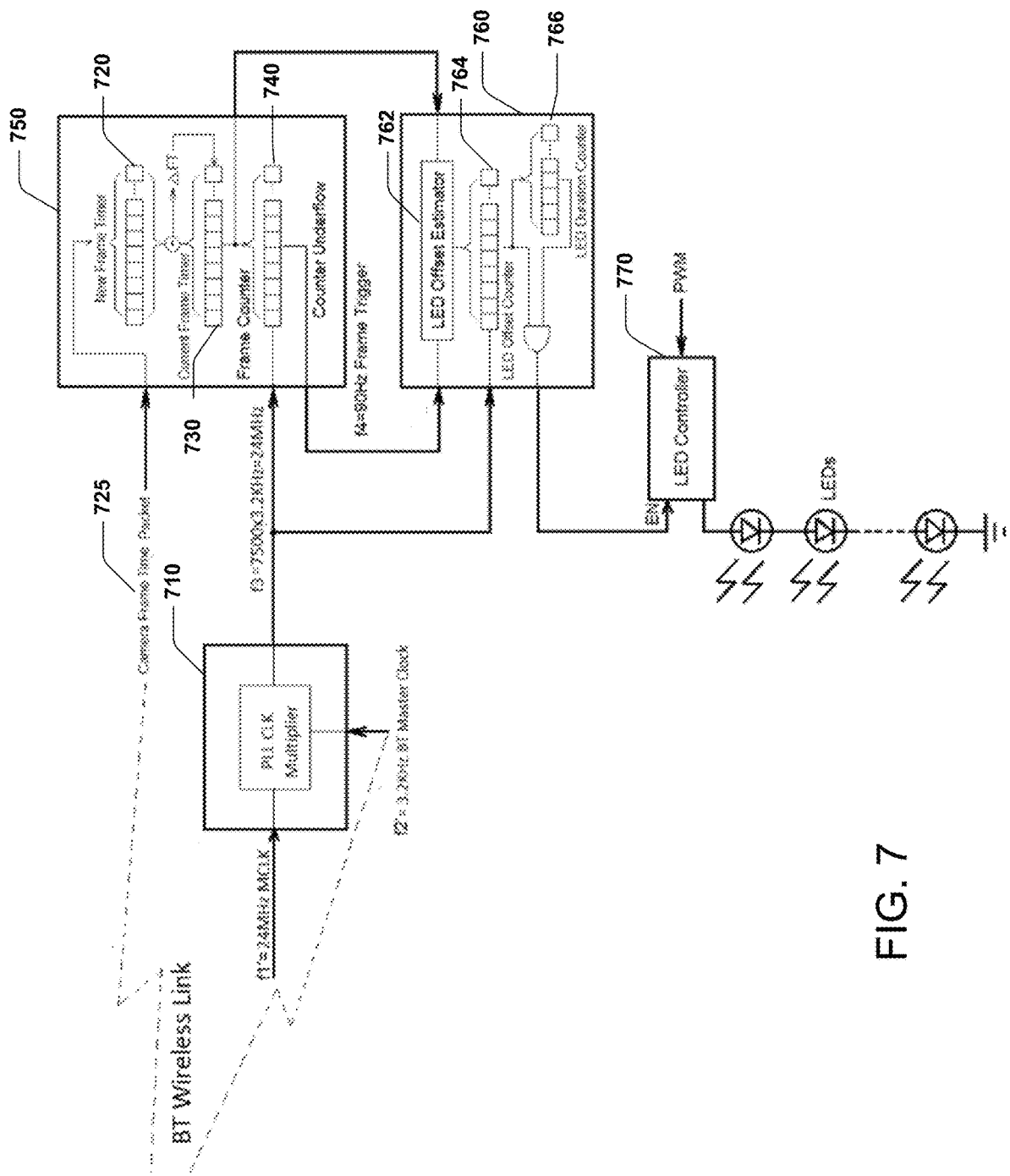
FIG. 7 is a diagram showing aspects of the configuration and operation of a device that can be utilized to implement the various configurations disclosed herein.

FIG. 7 illustrates various components on the controller according to some embodiments. Illustrated is clock multiplier 710 which may be the same clock multiplier part as clock multiplier 600 of FIG. 6. The clock multiplier 710 may be used to generate the 24 MHz f3 clock that is phase locked to the 3.2 KHz master clock for LED timing control. The 24 MHz f1 and f1' may be slightly different due to their being from a different source, but both are phase locked to the 3.2 MHz BT master clock.

Also illustrated in FIG. 7 are two 24-bit registers holding a new frame timer (NFT) 720 and current frame timer (CFT) 730. The NFT 720 may be configured to hold the camera frame time received from the HMD in the camera frame time Bluetooth packet 725. The CFT 730 may hold the frame time compensated by the averaged frame time error resulting from the clock drift $\Delta FT$. The CFT 730 may also include a hardware frame counter 740 configured to generate a 90 Hz frame start trigger signal whenever counter underflow occurs. The block 750 may provide a wireless digital phase lock loop to ensure that the camera frame and LED control timing is synchronized until the HMD or 6DoF controller is powered off.

Block 760 includes a software LED offset estimator (LOE) 762 and two hardware counters: LED offset counter (LOC) 764 and LED duration counter (LDC) 766 at a resolution of 41.6 ns. The LOE 762 may estimate the LED starting time referenced to the frame trigger signal in the initial synchronization process. This time value may be stored in the LOC 764. When the LOC 764 underflows, it may trigger the LED to turn the LED on. At the same time, the LDC 766 may start counting down and turn the LED off when it underflows. The LDC 766 may be set by software. The LDC 766 may be the same as or shorter than the camera exposure time to allow for a sharp image to be captured when the 6DoF controller is in motion. The LED duration time may be programmable and may be determined by image sharpness requirements, the LED driving current, the camera sensor sensitivity, etc. FIG. 7 also illustrates an LED drive 770 with the enable pin and PWM for LED ON/OFF and brightness control, respectively. The brightness control data may be feedback from the HMD via the BT data packet.

Figure 8:
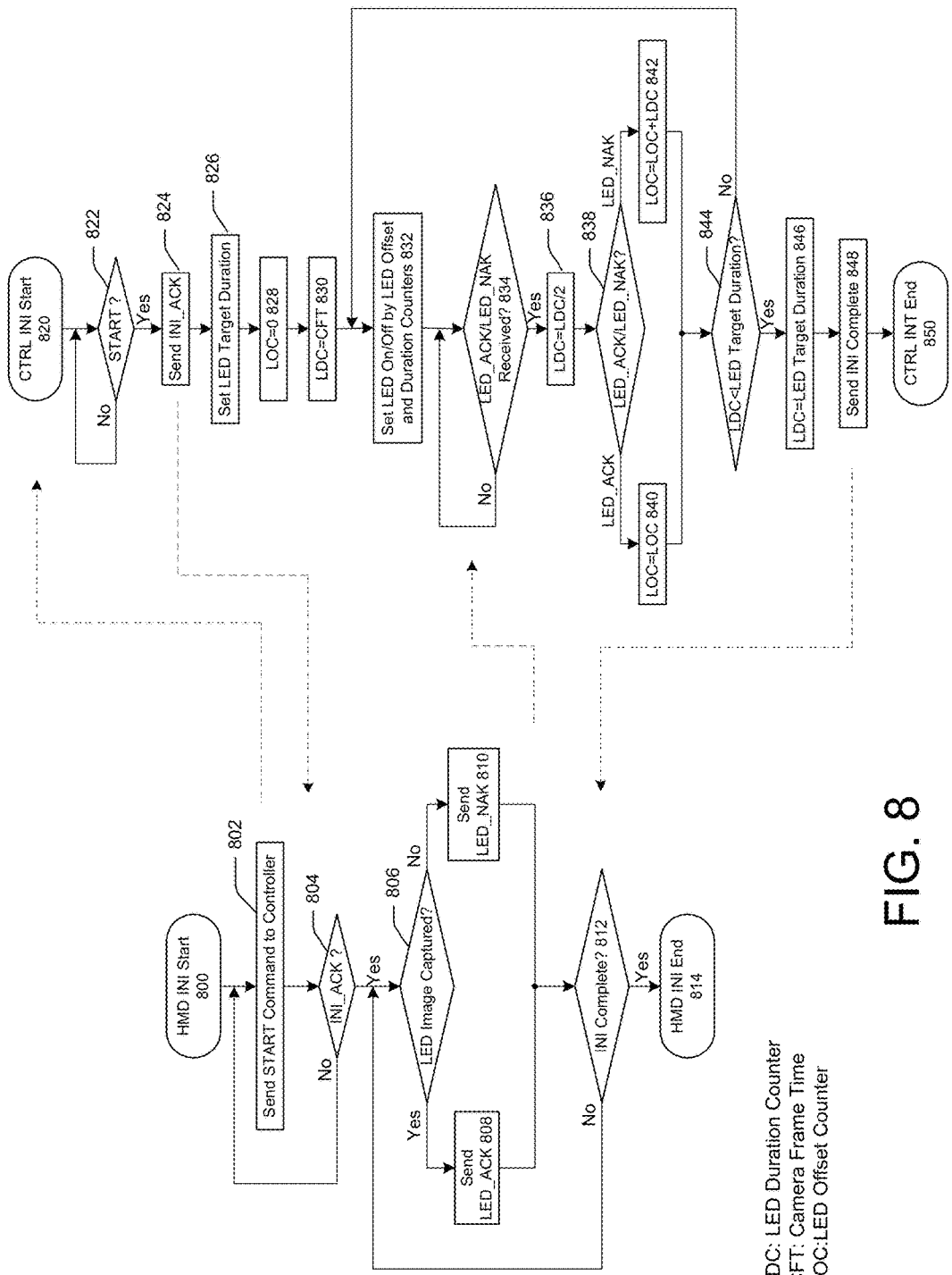
FIG. 8 is a flow diagram showing in example process that may be implemented in various configurations disclosed herein.

FIG. 8 illustrates a procedure that may be used to estimate LED offset through a handshake between the HMD and Controller. A binary search algorithm may be employed to determine the LED timing offset. The procedure may set LDC=CFT. The HMD initialization is illustrated in block 800. Block 802 illustrates that a Start command may be send to the controller. In block 804, it is determined if the initialization request has been acknowledged. If the request has not been acknowledged, then block 802 may be repeated. If the request has been acknowledged, then block 806 illustrates determining if the LED image has been captured. If the LED image has not been captured, then an LED_NAK 810 may be sent. If the LED image has been captured, then an LED_ACK 808 may be sent.

Block 812 illustrates determining if initialization has been completed. If initialization has not been completed, then the procedure returns to block 806. If initialization has been completed, then HMD initialization is completed 814.

Block 820 illustrates initialization of the controller. In block 822, it is determined if the initialization has started. If the initialization has not been started, then block 822 may be repeated. If the initialization has started, then block 824 illustrates sending an INI_ACK. Block 826 illustrates setting the LED target duration.

Block 828 illustrates setting the LED Offset Counter (LOC) to 0. Block 830 illustrates setting the LED Duration Counter (LDC) to the Camera Frame Time (CFT). Block 832 illustrates setting the LED On/Off based on the LED Offset Counter and LED Duration Counter 832. Block 834 illustrates determining if the LED_ACK or LED_NAK has been received. If the LED_ACK or LED_NAK has not been received, then block 834 is repeated. If the LED_ACK or LED_NAK has been received, then the LED Duration Counter may be divided by 2 as illustrated in block 836.

Block 838 illustrates determining if the LED_ACK or LED_NAK has been received. If the LED_ACK has been received, then block 840 illustrates LED Offset Counter remaining at the current value. If the LED_NAK has been received, then block 842 illustrates adding the LED Duration Counter to the LED Offset Counter.

Block 844 illustrates determining if the LED Duration Counter is less than the LED Duration Counter target duration. If the LED Duration Counter is not less than the LED Duration Counter target duration, then the procedure returns to block 832. If the LED Duration Counter is less than the LED Duration Counter target duration, then the LED Duration Counter is set to the LED target duration as shown in block 846. Block 848 illustrates sending the initialization complete message. Operation 850 completes the procedure.

Figure 9:
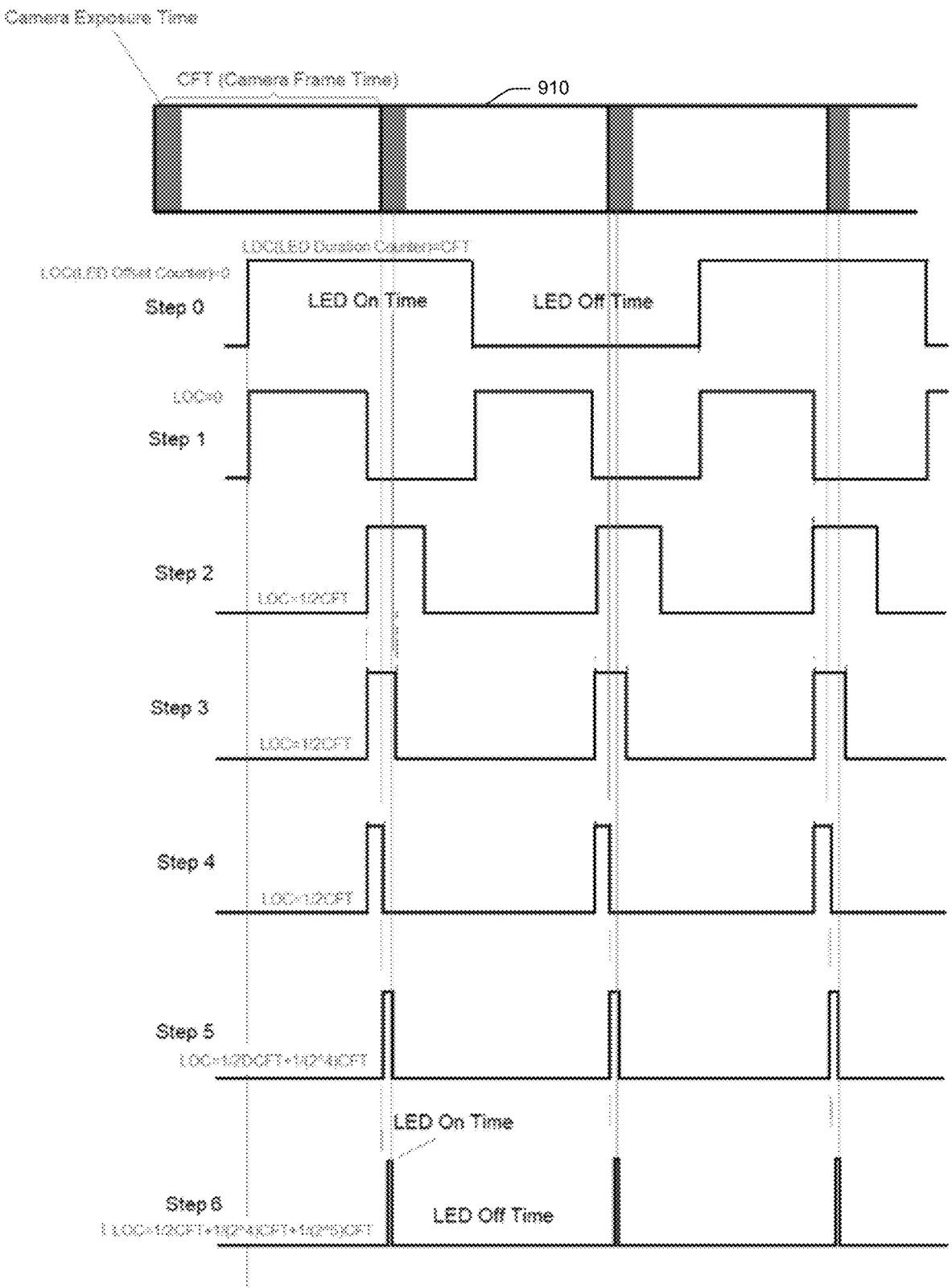
FIG. 9 is a timing diagram showing aspects of synchronization as disclosed herein.

FIG. 9 illustrates a camera and LED initial synchronization example with LDC=1/64 and CFT=174 us (90 pfs). The timing sequence 910 illustrates the camera exposure time and the camera frame time. At step 0, the LED Offset Counter is set to 0 and the LED Duration Counter is set to the camera frame time. At each successive step, the LED Offset Counter is updated until the LED On Time corresponds to the camera exposure duration and start time.

Figure 10:
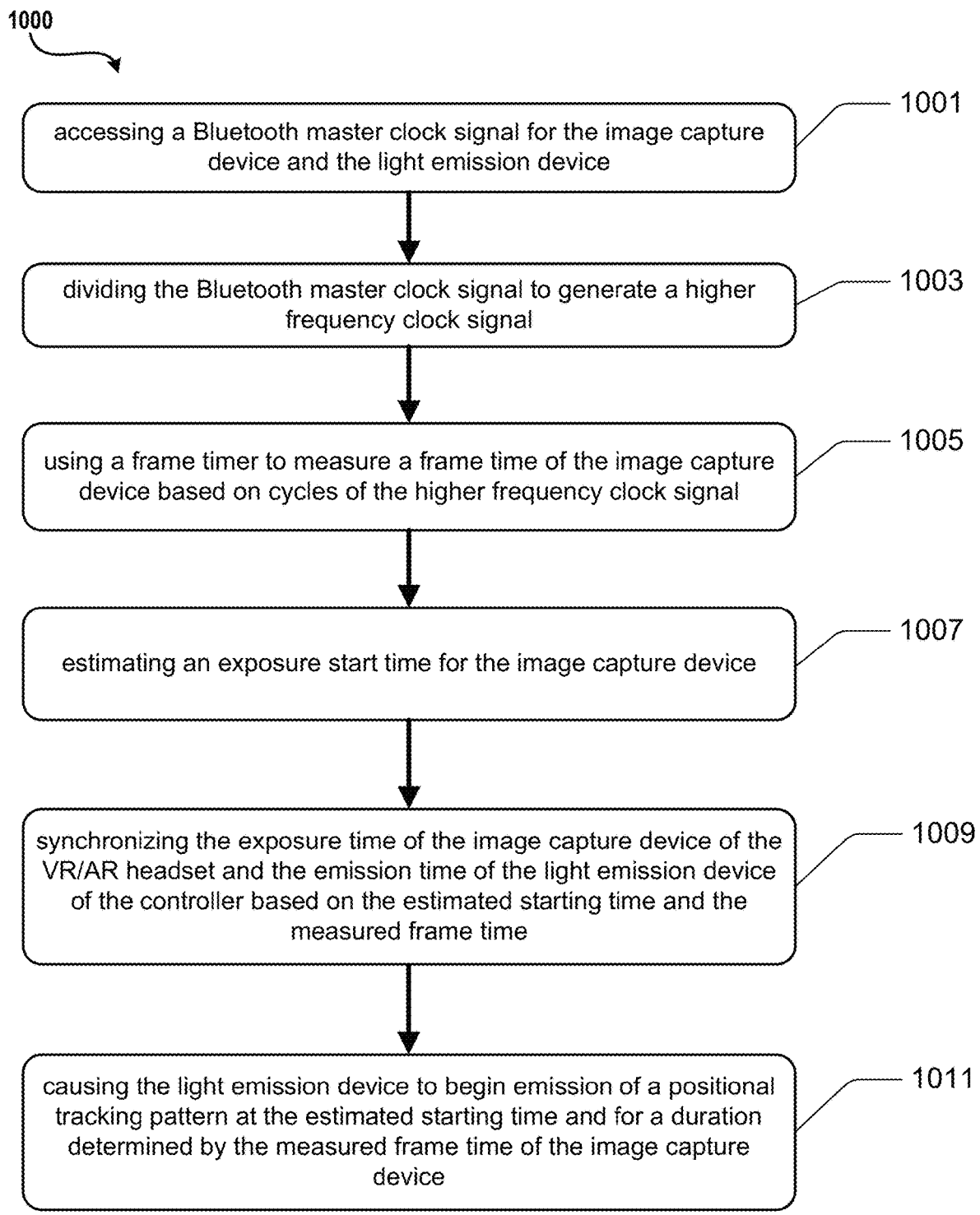
FIG. 10 is a flowchart depicting an example procedure for synchronization in accordance with the present disclosure.
Figure 11:
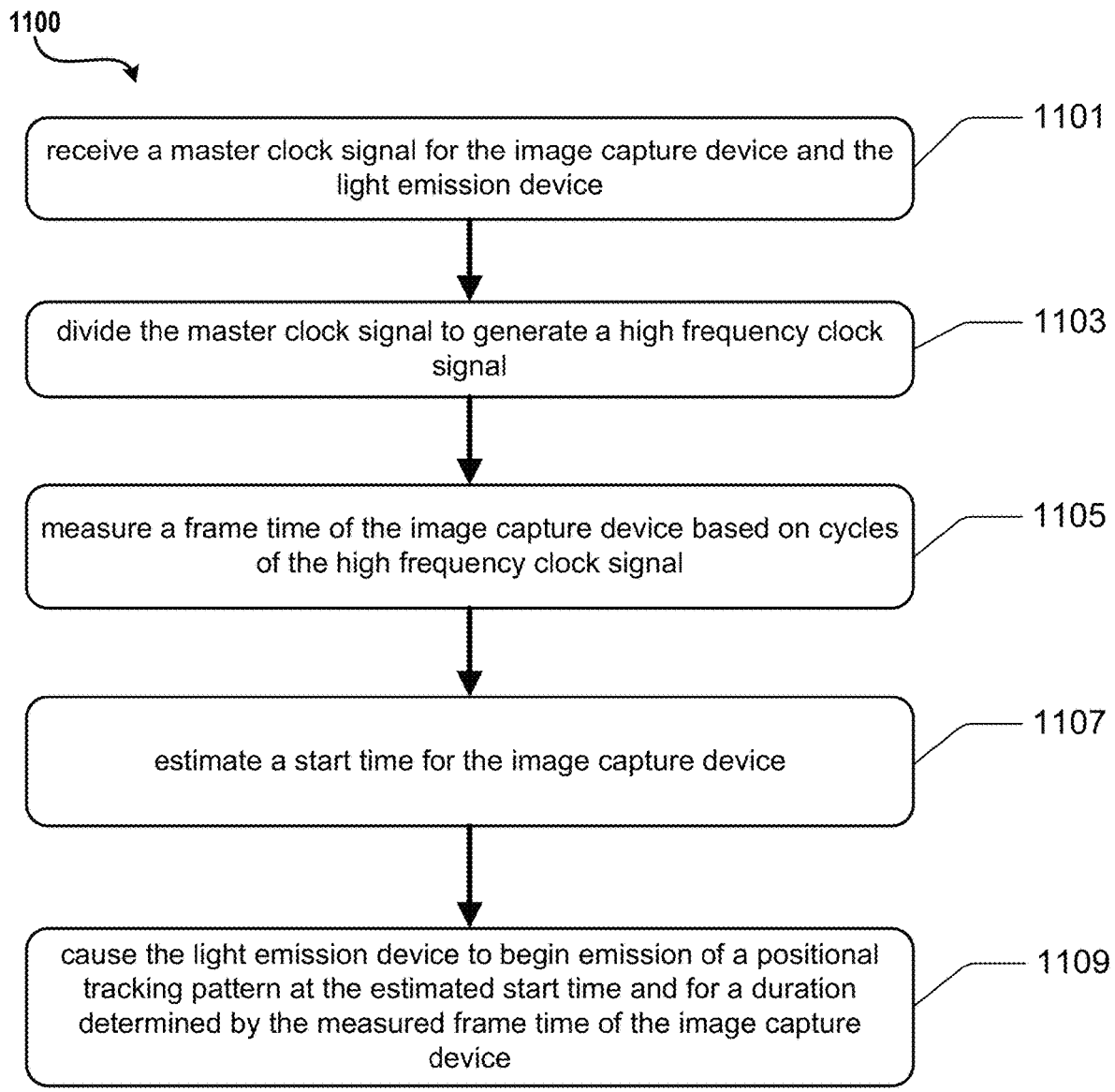
FIG. 11 is a flowchart depicting an example procedure for synchronization in accordance with the present disclosure.

FIGS. 10 and 11 are flow diagrams showing aspects of a routine disclosed herein for synchronizing an exposure time of an image capture device for a virtual reality/augmented reality (VR/AR) headset and an emission time of a communicatively coupled light emission device of a controller, the VR/AR headset configured to track positional movement of the controller based on tracking light emitted by the light emission device.

It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a computing device, it can be appreciated that this routine can be performed on any computing system which may include a number of computers working in concert to perform the operations disclosed herein.

Thus, it should be appreciated that the logical operations described herein are implemented (1) as a sequence of computer implemented acts or program modules running on a computing system such as those described herein and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Referring to FIG. 10, operation 1001 illustrates accessing a Bluetooth master clock signal for the image capture device and the light emission device.

Operation 1001 may be followed by operation 1003. Operation 1003 illustrates dividing the Bluetooth master clock signal to generate a higher frequency clock signal.

Operation 1003 may be followed by operation 1005. Operation 1005 illustrates using a frame timer to measure a frame time of the image capture device based on cycles of the higher frequency clock signal.

Operation 1005 may be followed by operation 1007. Operation 1007 illustrates based on an exposure timing signal from the image capture device and using clock cycles of the higher frequency clock signal, estimating an exposure start time for the image capture device.

Operation 1007 may be followed by operation 1009. Operation 1009 illustrates synchronizing the exposure time of the image capture device of the VR/AR headset and the emission time of the light emission device of the controller based on the estimated starting time and the measured frame time.

Operation 1009 may be followed by operation 1011. Operation 1011 illustrates causing the light emission device to begin emission of a positional tracking pattern at the estimated starting time and for a duration determined by the measured frame time of the image capture device. In an embodiment, the VR/AR headset is configured to track positional movement of the controller based on synchronization of the tracking light emitted by the light emission device and the exposure time of the image capture device.

In an embodiment, an offset estimator is used to estimate an initial exposure starting time for the image capture device.

In an embodiment, the dividing is performed using one or more phase lock loop (PLL) multipliers.

In an embodiment, averaged clock drift errors for the image capture device are added to the frame timer.

In an embodiment, two frame timers are used to store a previous frame time and a current frame time.

In an embodiment, the two frame timers are an LED offset counter and an LED duration counter.

In an embodiment, a RX/TX switching control pin is used as a synchronization reference.

In an embodiment, the exposure timing signal is a strobe sync signal.

In an embodiment, the estimating the starting time for the image capture device is performed using a binary search algorithm.

Turning now to FIG. 11, illustrated is an example operational procedure for synchronizing an exposure time of an image capture device for a virtual reality/augmented reality (VR/AR) headset and an emission time of a communicatively coupled light emission device of a controller, the VR/AR headset configured to track positional movement of the controller based on tracking light emitted by the light emission device, in accordance with the present disclosure. The operational procedure may be implemented in a system comprising one or more computing devices. Referring to FIG. 11, operation 1101 illustrates receiving a master clock signal for the image capture device and the light emission device.

Operation 1101 may be followed by operation 1103. Operation 1103 illustrates dividing the master clock signal to generate a high frequency clock signal.

Operation 1103 may be followed by operation 1105. Operation 1105 illustrates measuring a frame time of the image capture device based on cycles of the high frequency clock signal.

Operation 1105 may be followed by operation 1107. Operation 1107 illustrates based on a timing signal from the image capture device, estimating a start time for the image capture device.

Operation 1107 may be followed by operation 1109. Operation 1109 illustrates based on the estimated start time, causing the light emission device to begin emission of a positional tracking pattern at the estimated start time and for a duration determined by the measured frame time of the image capture device.

In an embodiment, the dividing is performed using one or more phase lock loop (PLL) multipliers.

In an embodiment, averaged clock drift errors for the image capture device are added to the frame time.

In an embodiment, the estimating the starting time for the image capture device is performed using a binary search algorithm.

In an embodiment, the master clock signal is a Bluetooth timing signal.

Figure 12:
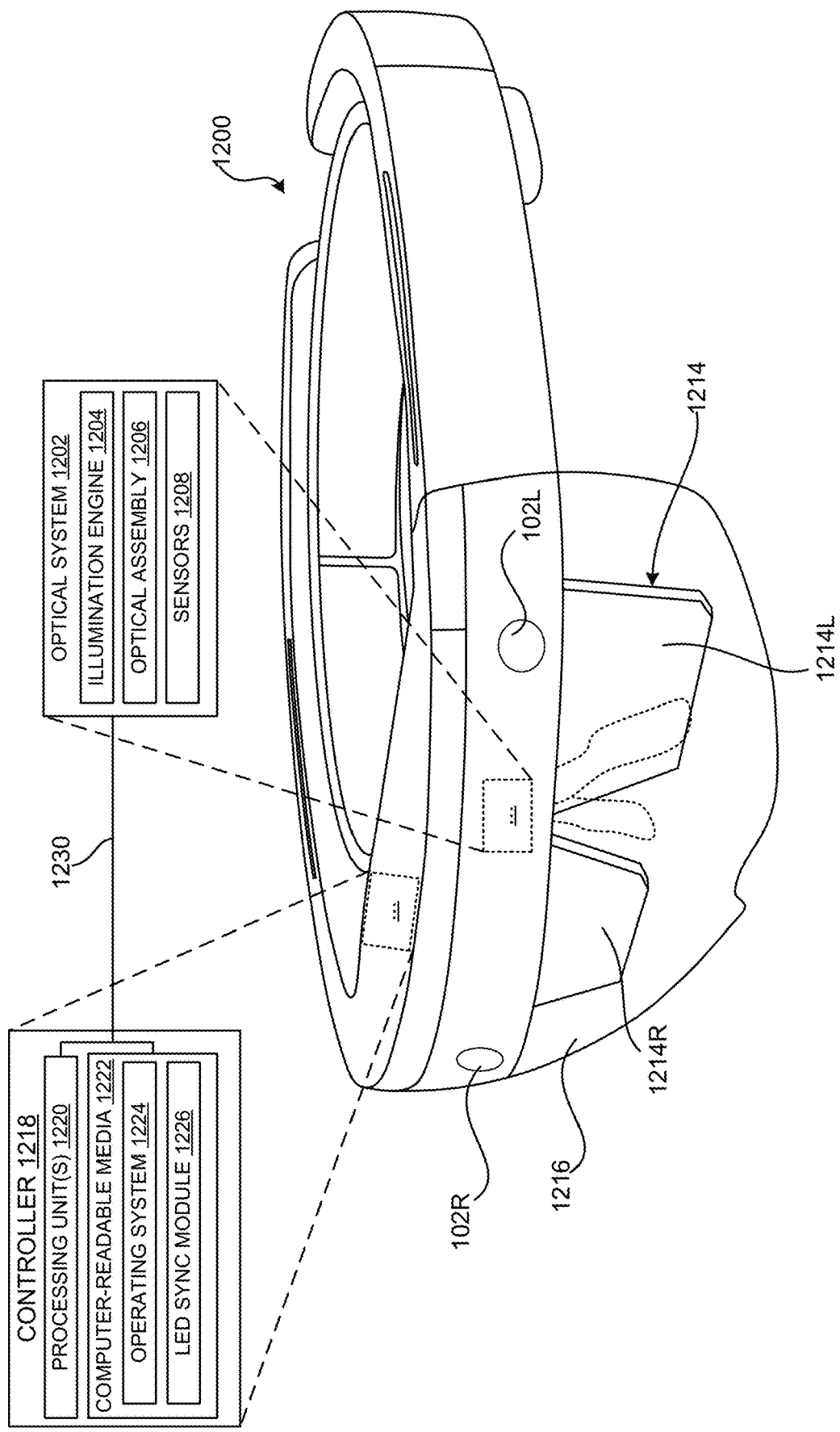
FIG. 12 is a device diagram showing aspects of an HMD device that can be utilized to implement the various configurations disclosed herein.

FIG. 12 is a computing device diagram showing aspects of the configuration of an AR device 1200 that can be utilized to implement the various configurations disclosed herein. As described briefly above, AR devices superimpose CG images over a user's view of a real-world environment. For example, an AR device 1200 such as that shown in FIG. 12 might generate composite views to enable a user to visually perceive a CG image superimposed over a visually perceived physical object that exists within a real-world environment.

In the example shown in FIG. 12, an optical system 1202 includes an illumination engine 1204 to generate electromagnetic ("EM") radiation, including some or all of the visible-light portion of the EM spectrum. In this example, the optical system 1202 further includes an optical assembly 1206 that is positioned to receive the EM radiation from the illumination engine 1204 and to direct the EM radiation (or individual bandwidths thereof) along one or more predetermined optical paths. For example, the illumination engine 1204 may emit the EM radiation into the optical assembly 1206.

In some instances, a user experience is dependent on the AR device 1200 accurately identifying characteristics of a physical object or plane and then generating the CG image in accordance with these identified characteristics. For example, suppose that the AR device 1200 is programmed to generate a user perception that a virtual gaming character is running towards and ultimately jumping over a real-world structure. To achieve this user perception, the AR device 1200 might obtain detailed data defining features of the real-world terrain around the AR device 1200.

In some examples, the AR device 1200 utilizes an optical system 1202 to generate a composite view (e.g., from a perspective of a user that is wearing the AR device 1200) that includes both one or more CG images and a view of at least a portion of the real-world environment. For example, the optical system 1202 might utilize various technologies such as, for example, AR technologies to generate composite views that include CG images superimposed over a real-world view. As such, the optical system 1202 might be configured to generate CG images via an optical assembly 1206 that includes a display panel 1214.

In the illustrated example, the display panel includes separate right eye and left eye transparent display panels, labeled 1214R and 1214L, respectively. In some examples, the display panel 1214 includes a single transparent display panel that is viewable with both eyes or a single transparent display panel that is viewable by a single eye only. Therefore, it can be appreciated that the techniques described herein might be deployed within a single-eye device (e.g. the GOOGLE GLASS AR device) and within a dual-eye device (e.g. the MICROSOFT HOLOLENS AR device).

Light received from the real-world environment passes through the see-through display panel 1214 to the eye or eyes of the user. Graphical content displayed by right-eye and left-eye display panels, if configured as see-through display panels, might be used to visually augment or otherwise modify the real-world environment viewed by the user through the see-through display panels 1214. In this configuration, the user is able to view virtual objects that do not exist within the real-world environment at the same time that the user views physical objects within the real-world environment. This creates an illusion or appearance that the virtual objects are physical objects or physically present light-based effects located within the real-world environment.

In some examples, the display panel 1214 is a waveguide display that includes one or more diffractive optical elements ("DOEs") for in-coupling incident light into the waveguide, expanding the incident light in one or more directions for exit pupil expansion, and/or out-coupling the incident light out of the waveguide (e.g., toward a user's eye). In some examples, the AR device 1200 further includes an additional see-through optical component, shown in FIG. 12 in the form of a transparent veil 1216 positioned between the real-world environment and the display panel 1214. It can be appreciated that the transparent veil 1216 might be included in the AR device 1200 for purely aesthetic and/or protective purposes.

The AR device 1200 might further include various other components (not all of which are shown in FIG. 12), for example, front-facing cameras 102 (e.g. RGB, B&W, or IR cameras), speakers, microphones, accelerometers, gyroscopes, magnetometers, temperature sensors, touch sensors, biometric sensors, other image sensors, energy-storage components (e.g. battery), a communication facility, a global positioning system ("GPS") a receiver and, potentially, other types of sensors. Data obtained from one or more sensors 1208, some of which are identified above, can be utilized to determine the orientation, location, and movement of the AR device 1200.

In the illustrated example, the AR device 1200 includes one or more logic devices and one or more computer memory devices storing instructions executable by the logic device(s) to implement the functionality disclosed herein. In particular, a controller 1218 can include one or more processing units 1220, one or more computer-readable media 1222 for storing an operating system 1224, other programs (such as a LED synchronization module 1226 configured to in the manner disclosed herein), and data.

In some implementations, the AR device 1200 (and MR devices) is configured to analyze data obtained by the sensors 1208 to perform feature-based tracking of an orientation of the AR device 1200. For example, in a scenario in which the object data includes an indication of a stationary object within the real-world environment (e.g., a table), the AR device 1200 might monitor a position of the stationary object within a terrain-mapping field-of-view ("FOV"). Then, based on changes in the position of the stationary object within the terrain-mapping FOV and a depth of the stationary object from the AR device 1200, the AR device 1200 might calculate changes in the orientation of the AR device 1200.

It can be appreciated that these feature-based tracking techniques might be used to monitor changes in the orientation of the AR device 1200 for the purpose of monitoring an orientation of a user's head (e.g., under the presumption that the AR device 1200 is being properly worn by a user).

The computed orientation of the AR device 1200 can be utilized in various ways, some of which have been described above.

The processing unit(s) 1220, can represent, for example, a central processing unit ("CPU") –type processing unit, a graphics processing unit ("GPU") –type processing unit, a field-programmable gate array ("FPGA")", one or more digital signal processors ("DSPs"), or other hardware logic components that might, in some instances, be driven by a CPU. For example, and without limitation, illustrative types of hardware logic components that can be used include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As used herein, computer-readable media, such as computer-readable media 1222, can store instructions executable by the processing unit(s) 1220, such as instructions which, when executed, provide LED synchronization in the manner disclosed herein. Computer-readable media can also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media can include computer storage media and/or communication media. Computer storage media can include one or more of volatile memory, non-volatile memory, and/or other persistent and/or auxiliary computer storage media, removable and non-removable computer storage media implemented in any method or technology for storage of information such as computer-readable instructions, data structures, program modules, or other data.

Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, rotating media, optical cards or other optical storage media, magnetic storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Based on the foregoing, it should be appreciated that technologies for LED synchronization have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the claims below.

What is claimed is:

1. A method for synchronizing an exposure time of an image capture device and an emission time of a communicatively coupled light emission device of a controller, the method comprising:
   accessing a wireless protocol master clock signal for the image capture device and the light emission device;
   dividing the wireless protocol master clock signal to generate a higher frequency clock signal;
   measuring a frame time of the image capture device based on cycles of the higher frequency clock signal;
   based on an exposure timing signal from the image capture device and clock cycles of the higher frequency clock signal, estimating an exposure start time for the image capture device; and
   synchronizing the exposure time of the image capture device and the emission time of the light emission device of the controller based on the estimated starting time and the measured frame time.

2. The method of claim 1, further comprising using an offset estimator to estimate an initial exposure starting time for the image capture device.

3. The method of claim 1, wherein the dividing is performed using one or more phase lock loop (PLL) multipliers.

4. The method of claim 3, further comprising adding averaged clock drift errors for measuring the frame time.

5. The method of claim 4, further comprising storing a previous frame time and a current frame time.

6. The method of claim 5, wherein the previous frame time and current frame time are stored using two frame timers comprising an LED offset counter and an LED duration counter.

7. The method of claim 1, further comprising using a RX/TX switching control pin as a synchronization reference.

8. The method of claim 1, wherein the exposure timing signal is a strobe sync signal.

9. The method of claim 1, wherein the estimating the exposure start time is performed using a binary search algorithm.

10. A system, comprising:
    an image capture device;
    a controller communicatively, the controller comprising a light emission device; and
    a computer storage medium having instructions stored thereupon which, when executed by a processor, cause the system to:
    receive a master clock signal for the image capture device and the light emission device;
    divide the master clock signal to generate a high frequency clock signal;
    measure a frame time of the image capture device based on cycles of the high frequency clock signal; and
    based on a timing signal from the image capture device, estimate a start time for the image capture device.

11. The system of claim 10, wherein the dividing is performed using one or more phase lock loop (PLL) multipliers.

12. The system of claim 10, further comprising adding averaged clock drift errors to the frame time.

13. The system of claim 10, wherein the estimating the start time is performed using a binary search algorithm.

14. The system of claim 10, wherein the master clock signal is a wireless protocol timing signal.

15. A controller comprising:
    a light emission device; wherein the controller is communicatively coupled to an image capture device; and
    a computer storage medium having instructions stored thereupon which, when executed by a processor, cause the controller to:
    receive a master clock signal for the controller;
    divide the master clock signal to generate a high frequency clock signal;
    measure a frame time of the image capture device based on cycles of the high frequency clock signal; and
    based on a timing signal from the image capture device, estimate a start time for the image capture device.

16. The controller of claim 15, wherein the master clock signal is common to the controller and a VR/AR headset.

17. The controller of claim 15, wherein the dividing is performed using one or more phase lock loop (PLL) multipliers.

18. The controller of claim 15, wherein the estimating the start time for the image capture device is performed using a binary search algorithm.

19. The controller of claim 15, wherein the master clock signal is a wireless protocol timing signal.

20. The controller of claim 15, further comprising using two frame timers to store a previous frame time and a current frame time, wherein the two frame timers are an LED offset counter and an LED duration counter.

* * * * *